(12) United States Patent
Pelkey et al.

(10) Patent No.: US 7,299,955 B2
(45) Date of Patent: Nov. 27, 2007

(54) HOT BEVERAGE CONTAINER

(76) Inventors: Michael H Pelkey, 2591 E. Lee St., Simi Valley, CA (US) 93065; James R Johns, 7375 Mannix Ct., San Diego, CA (US) 92129

( * ) Notice: Subject to any disclaimer, the term of this patent is extended or adjusted under 35 U.S.C. 154(b) by 151 days.

(21) Appl. No.: 10/205,247

(22) Filed: Jul. 25, 2002

(65) Prior Publication Data
US 2003/0019365 A1 Jan. 30, 2003

Related U.S. Application Data

(60) Provisional application No. 60/308,057, filed on Jul. 25, 2001.

(51) Int. Cl.
*A47G 19/14* (2006.01)

(52) U.S. Cl. .............. 222/465.1; 222/475.1; 222/556

(58) Field of Classification Search ............ 222/556, 222/146.5, 475.1, 465.1
See application file for complete search history.

(56) References Cited

U.S. PATENT DOCUMENTS

| 3,212,686 | A | * | 10/1965 | Di Pierro et al. | 222/472 |
|---|---|---|---|---|---|
| 4,526,797 | A | * | 7/1985 | Stone, Jr. | 426/520 |
| 4,703,871 | A | * | 11/1987 | Broker | 222/465.1 |
| 4,715,269 | A | * | 12/1987 | Stoner | 99/279 |
| 4,773,563 | A | * | 9/1988 | Taylor | 222/556 |
| 4,966,780 | A | * | 10/1990 | Hargraves et al. | 426/118 |
| 5,273,194 | A | * | 12/1993 | McNamara | 222/470 |
| 5,779,102 | A | * | 7/1998 | Smith | 222/475.1 |
| 6,499,628 | B1 | * | 12/2002 | Lassota | 222/1 |
| 6,505,752 | B1 | * | 1/2003 | Rolfes et al. | 220/592.16 |

* cited by examiner

*Primary Examiner*—Philippe Derakshani
(74) *Attorney, Agent, or Firm*—Colin P. Abrahams

(57) ABSTRACT

A lid is provided for a beverage container having a base, side walls and an upper rim. The lid comprises a body having an upper surface, a lower surface and an end wall. The end wall sealingly connects the wall of the lid to the upper rim of the beverage container. An aperture extends through the body from the upper surface to the lower surface thereof. A stopper is provided and is movable between first and second positions for selectively closing off and opening the aperture in the body member.

22 Claims, 4 Drawing Sheets

HOT BEVERAGE CONTAINER

CROSS REFERENCE TO RELATED APPLICATIONS

This applications claims the benefit of U.S. Provisional application No. 60/308,057 filed Jul. 25, 2001, and incorporated herein in its entirety.

FIELD AND BACKGROUND OF THE INVENTION

This invention relates to hot beverage containers. More particularly, the invention relates to a carafe for holding brewed coffee, the carafe including a lid, with both the carafe and the lid being designed to facilitate coffee flavor retention. The invention also relates to a beverage container in conjunction with a base member configured for modulating, varying and/or limiting the amount of heat provided to the hot beverage container.

Coffee brewing machines, or coffee makers, are well-known and widely available in a significant number of forms. In a conventional, automatic drip-type coffee maker, there is provided a water reservoir, a water-heating element, a basket or other container for containing ground coffee, typically mounted on a filter, a carafe and a carafe-heating element. In typical form, the water reservoir will be filled with the desired amount of water. The user then places ground coffee in a filter, both of which are then located in the basket. A beverage container or carafe is placed on the hot plate. The coffee machine is then switched on, and water is drained from the reservoir, heated, and conveyed to the basket. The hot water, which may have some steam mixed therein, passes through the coffee and coffee filter, acquiring the necessary flavor, and is then channeled through a small orifice in the basket so as to drip into the carafe which is situated below it. When all the water in the reservoir has passed through the system into the carafe, it remains stored therein, and the coffee within the carafe is heated and kept hot by heat from the hot plate.

A typical carafe may comprise a lid which fits around the brim of the carafe. The lid for a conventional carafe would have two apertures therein, one usually centrally located through which the coffee can pass from the basket into the carafe, and another, usually peripherally located, through which the stored coffee can be poured from the carafe into a cup or other container. These two apertures leave a significant "exposed" or open area across the brim of the carafe.

The hot plate on which the freshly brewed coffee in the carafe is mounted typically keeps the temperature of the coffee at approximately 150° F. to 185° F. As mentioned, the conventional carafe lid, if present, is designed to provide sufficient open area between the inside of the carafe and the outside thereof, in order to allow the brewed coffee to fall from the basket, into the carafe, and for pouring brewed coffee therefrom. Therefore, while this open area is intended to meet certain needs, it also constitutes a wide open path for the heated, brewed coffee within the carafe to evaporate. Thus, as long as heat is being applied from an external source (the hot plate) to the coffee within the carafe, referred to as the "keep warm mode", the heating and evaporation of the coffee produces a continuous reduction in the volume of the original brew. Both water and aromatic compounds are continuously lost, eventually leaving behind a thick soup of bad-tasting chemicals. Eventually, usually after about 20 to 30 minutes, the coffee becomes unfit to drink. Further, if left on the hot plate for extended periods of time, the coffee will eventually lose all of its water to evaporation, leaving a thick paste burnt at the bottom of the carafe, which is very difficult to remove.

As will be noted from the above discussion, the "keep warm mode" temperature is actually sufficiently high to cook the brew. Therefore, conventional coffee makers will only retain a flavorful and desirable coffee brew for a limited amount of time, and the extended application of heat through the hot plate eventually ruins the coffee.

The prior art shows various attempts to correct this problem. For example, U.S. Pat. No. 5,699,719 (Lucas) shows a thermal carafe brewing device including a pressure control valve which prevents liquid and heat from flowing out of the carafe through the lid. U.S. Pat. No. 4,526,797 (Stone) tries to address this problem by teaching a "temperature differential" concept, but does not provide a sealed lid. U.S. Pat. No. 4,638,929 (Stone) discloses an injection-molded top assembly for open-mouth coffee pots, and comprises two injection-molded parts, and a self-sealing top assembly to achieve this.

U.S. Pat. No. 6,246,032 (Quinn) shows a fabric disc to protect the flavor of coffee or tea from excess heating, comprising heat-resistant fibers, while U.S. Pat. No. 4,715,269 (Stoner) includes a closed top decanter and warming plate, heated to a temperature only slightly above the desired temperature of the coffee.

SUMMARY OF THE INVENTION

One form of the present invention is therefore directed towards providing a carafe which includes a lid, the lid having a brewed coffee receiving aperture, as well as a pouring spout, wherein the aperture and spout capable of being open and closed. The apertures will of course be open during the actions of brewing and pouring of the coffee respectively, but, in the intervening periods, they will be sealed so as to preserve the coffee flavor by substantially preventing loss of liquid due to evaporation.

The aperture for receiving brewed coffee, and the spout for pouring coffee, may be the same. However, different aperture contained within the lid would also fall within the scope of the invention.

In a particular embodiment, the lid may have a minute orifice therein which permits a very slow escape to prevent build-up of pressure. In another form, a pressure-sensitive valve may be provided.

Another aspect of the invention incorporates the use of a base upon which the carafe rests, the base being located intermediate the hot plate and the bottom of the carafe, to thereby modulate the amount of heat reaching the coffee from the hot plate. Preferably, the intermediate base allows sufficient heat to reach the coffee so as to keep it hot, but also to prevent an excessive amount of pressure build-up, which could compromise the carafe component and lid.

Therefore, the carafe, lid and base of the invention permit coffee to be kept hot for extended periods of time with no or very little loss of flavor or aroma. This is achieved by preventing the loss of any of the coffee's vapors during the "keep warm mode" of operation.

In one form of the invention, the carafe may be heated at a "keep warm mode" temperature which may be about 65° C. (about 150° F.), and the carafe and lid assembly is designed so as to withstand an . equilibrium vapor pressure of approximately 4 psi at this normal "keep warm mode" temperature.

According to one aspect of the invention, there is provided a lid for a beverage container having a base, side walls and an upper rim, the lid comprising: a body member having an upper surface, a lower surface and an end wall; means associated with the end wall for sealingly connecting the wall of the lid to the upper rim of the beverage container; an aperture extending through the body member from the upper surface to the lower surface thereof; and a stopper member movable between first and second positions for selectively closing off and opening the aperture in the body member.

The body member comprises a substantially flat disc-shaped member; a substantially horizontal surface and peripheral depending side wall extending therefrom, the depending side walls sealingly connected to the upper rim of the carafe; or a substantially circular member having depth, the aperture being formed through the depth of the circular member, a portion of which sealingly engages with an upper rim of the carafe.

A small orifice may be formed within the lid to provide limited communication between the carafe and ambient space.

Preferably, the stopper member moves between the first and second position by sliding on or in tracks formed on the upper surface of the body member. In another embodiment, the stopper member comprises pivot members connected to the body member, the stopper member being pivotable between the first and second position.

According to another aspect of the invention, there is provided a carafe and lid assembly comprising: a carafe having a base wall and an upwardly extending sidewall terminating in an upper rim, the carafe having a chamber for containing a beverage; a lid sealingly received within the upper rim of the carafe, the lid comprising: a body member having an upper surface, a lower surface and an end wall which abuts and seals with the upper rim of the carafe, an aperture formed in the body member and extending from the upper surface to the lower surface thereof to provide a passage between the chamber of the carafe and the ambient space outside the carafe, and a stopper member formed about the aperture, the stopper member being movable between a first and second position for selectively closing off and opening the aperture in the body member.

The carafe and lid assembly may further comprises a heat modulator, the heat modulator being configured so as to rest on a hot plate, and having means for receiving the carafe so that the base wall thereof will not be in direct contact with the hot plate.

According to yet another aspect of the invention, there is provided a method for prolonging the volume content and aroma of a brewed beverage in a carafe having a lid, the method comprising: attaching the lid to the carafe so as to provide an airtight sealed space defined by the carafe and lid; forming an aperture in the lid so that the space in the carafe can communicate with the exterior thereof; and selectively opening and closing the aperture in the lid, the aperture being open when beverage is being introduced to the space and poured therefrom, and closed when the beverage remains unused in the space.

DETAILED DESCRIPTION OF THE INVENTION

Reference is now made to the accompanying drawings which show various aspects of different embodiments of the invention, which comprises a carafe, typically used for holding brewed coffee in a coffee maker, and a lid which is sealed thereto. The lid includes one or more apertures for providing access to liquid streaming from a coffee maker basket, namely, the coffee produced therein. The brewed coffee may pass through the apertures for storage within the carafe.

Figure 1:
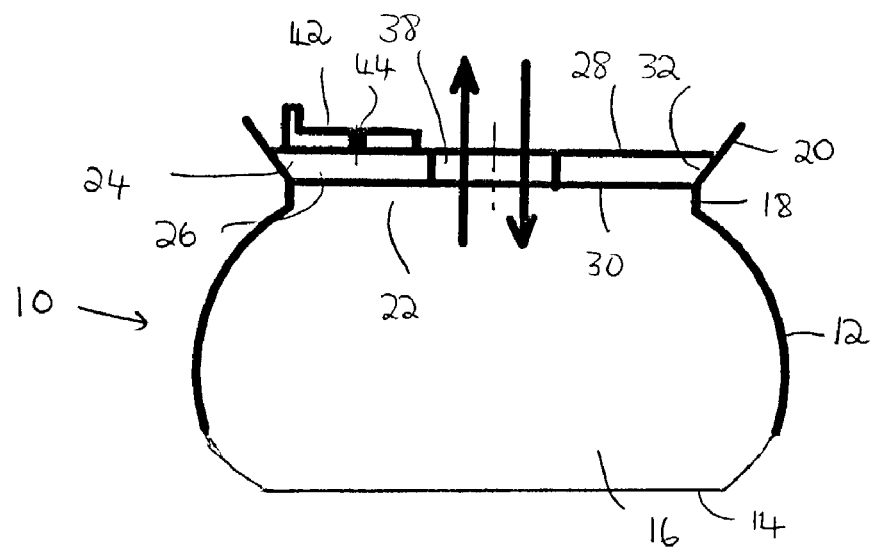
FIG. 1 is a diagrammatic side view of a carafe and lid combination, with the lid in the "open" position.

With reference to FIG. 1 of the drawings, there is shown a carafe 10 comprising side walls 12 and a base member 14. The side walls 12 and base member 14 define a space or chamber 16, adapted to receive a hot beverage, preferably brewed coffee, as will be described further below. The side walls 12 terminate at their upper end with a rim 18, and the rim 18 includes a flange 20 which, in the embodiment shown in FIG. 1, is directed upwardly and outwardly from the carafe chamber 16. In the area defined by the rim 18 and flange 20 there is an opening 22. A lid 24 is designed to sealingly engage the carafe 10 in the opening 22. By the term "sealingly engage", it should be understood that the lid 24 attaches to the rim 18 and/or flange 20 in such a way as to form an airtight, liquid-tight seal, so that, when the lid is sealed, as will be described, air and liquid cannot escape through any space between the lid 24 and the rim 18.

The lid 24 comprises an annular portion 26, having an upper surface 28, a lower surface 30, and an angled side wall 32. The angle of the side wall 32 is configured so as to sealingly engage the rim 18 and/or flange 20 of the carafe 10 in the manner discussed above. For the purposes of this invention, it is not of particular importance how this seal is achieved, and several different conventional methods for securing the seal fall within the scope of the invention. Thus, by way of example only, the seal may be achieved by the threaded interaction between the lid 24 and carafe 10, or it may be due to hold-downs, such as clamps, suction, or any other way.

The annular portion 26 includes a substantially centrally located aperture 38. The aperture 38 is formed within the lid 24 so that coffee falling from a filter basket, or the like, located above the carafe 10, will stream downwardly therefrom, through the aperture 38, and into the space 16 where it will be stored until needed.

Figure 2:
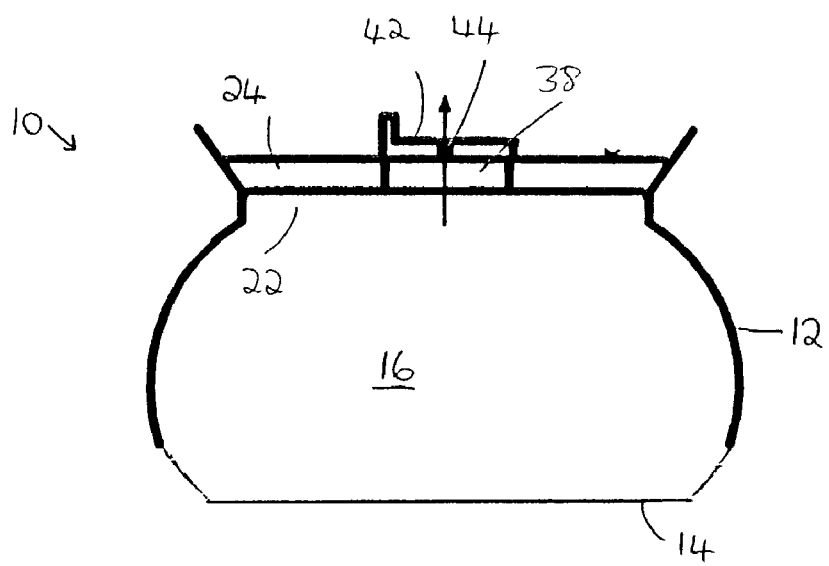
FIG. 2 is a diagrammatic side view of the carafe and lid shown in FIG. 1 of the drawings, but with the lid in the "closed" position.

Mounted on the upper surface 28 of the lid 24 is a slide stopper 42. As will be seen by comparing FIG. 1 and FIG. 2 of the drawings, the slide stopper 42 is movable between a first open position, shown in FIG. 1, and a second closed position, shown in FIG. 2 of the drawings. The slide stopper 42 slides on tracks, or within grooves, formed in the upper surface 28 of the lid 24 in conventional fashion. When the slide stopper 42 is in the closed position, as illustrated in FIG. 2, the aperture 38 is completely sealed, and air, moisture and the like will not be able to pass through the lid. Further, due to the sealing engagement between the side wall 32 of the lid 24, and the rim 18 of the carafe 10, the lid 24 effectively seals the space 16 of the carafe 10 when in the closed position.

In one form of the invention, the lid 24 may contain a very small orifice 44. This orifice 44 is optional, and is shown in the stopper 42 of FIGS. 1 and 2 of the drawings. The orifice 44 is small enough to allow just a minimum escape of fluid and aroma particles of the coffee from the space 16, so as to have only a very small impact on the degradation of the quality of the coffee over time. On the other hand, the orifice 44 prevents an unacceptable build-up of pressure within the space 16, and is useful when the materials and construction of the carafe and lid are not capable of withstanding the internal pressures within the space 16.

The embodiment of the carafe and lid shown in FIGS. 1 and 2 of the drawings thus uses a fully sealed and gas-tight carafe and lid assembly to prevent the coffee's vapor molecules from escaping into the ambient atmosphere during the "keep warm mode" of operation. The carafe and lid assembly should preferably be designed so as to accommodate an equilibrium vapor pressure of approximately 4 psi at the normal heat-warm temperature, which is typically about 65° C. (about 150° F.) for home-type units, but more typically in the range of 180° F. to 185° F. in office or restaurant type units. Further, this embodiment allows the easy selection between the open architecture of the lid required for the brewing and coffee pouring procedures, and the sealed architecture required to preserve flavor and volume during the "keep warm mode" periods. In this way, the full aroma and flavor of the coffee can be preserved by heating the brewed coffee in a fully sealed, gas-tight carafe to the full "keep warm mode" temperature.

An electrical hot plate (not shown in FIGS. 1 and 2 but illustrated elsewhere in this specification), is typically used to heat the carafe, but it should be appreciated that heat can be supplied by any means, provided the "keep warm mode" temperature for which the carafe is designed is not exceeded.

It should also be appreciated that the term "carafe" may include any container for holding brewed coffee. Such carafes vary somewhat widely in practice, and may have slightly different shapes and forms. For example, the opening 22 at the rim 18 may vary from being somewhat narrow to being much wider. The carafe and lid assembly of the invention is also designed to withstand the "keep warm mode" temperature, so as to be able to resist vapor pressure up to, and possibly exceeding, 4 psi. Vapor pressures of even more full-bodied coffee brews may be accommodated.

If, however, the carafe and lid assembly is unable to tolerate a vapor pressure of about 4 psi or greater, asserted by the coffee gases at a typical "keep warm mode" temperature of about 150° F. to 185° F., the orifice 44, as described with respect to FIGS. 1 and 2, may be introduced to relieve the pressure under the circumstances. However, this orifice is an optional element of the invention, and would, in fact, tend only to be used when the overall ability of the carafe and lid assembly cannot withstand the internal vapor pressures produced by the heating. It should also be noted that the option of including the orifice 44 may result in some finite limitations to the amount of time coffee may be kept fresh, due to the small loss of vapor molecules over time. Although this orifice may therefore perform an important, even crucial, function in certain embodiments of the invention, it is, where possible, omitted or kept as small as the circumstances will permit to prevent compromise of the carafe and/or its contents.

It will be seen that the invention as illustrated in FIGS. 1 and 2 provides a suitable method for maintaining flavorful, aromatic coffee at the full "keep warm mode" temperature for extended periods of time, thus addressing the ongoing problem of poor taste and wastage associated with keeping brewed coffee hot and flavorful in conventional carafes and lids.

With reference to FIGS. 1 and 2 of the drawings, the stopper 42 is kept in the closed position, as illustrated in FIG. 2, once brewed coffee has been introduced thereto. When coffee is required to be poured, the stopper 42 can simply be slid off the aperture 38, allowing coffee to be freely poured from the carafe space 16 into a cup or other container.

When the stopper 42 is closed, as shown in FIG. 2, as long as the hot plate continues to supply heat, the internal/external temperature differential of the carafe will assure a partial pressure near the maximum vapor pressure internal to the carafe. When equilibrium vapor pressure, or saturation is reached, the net evaporation becomes zero, since the evaporation rate is substantially equal to the condensation rate at the equilibrium vapor pressure. In the alternative embodiment when the orifice 44 is present, a slight amount of ventilation to the ambient atmosphere may be allowed by virtue of the orifice 44, but as long as this orifice 44 is kept to very small dimensions, there is only a modest compromise in functionality.

In a preferred embodiment, the orifice 44 may be in the range of about 0.1 to 0.01 inch. In one form, this range is about 0.02 to 0.04 inch, and a specific diameter of about 0.031 inch will work well, relieving soem of the internal pressure in the carafe without allowing undue release of moisture and flavor therefrom.

Figure 3:
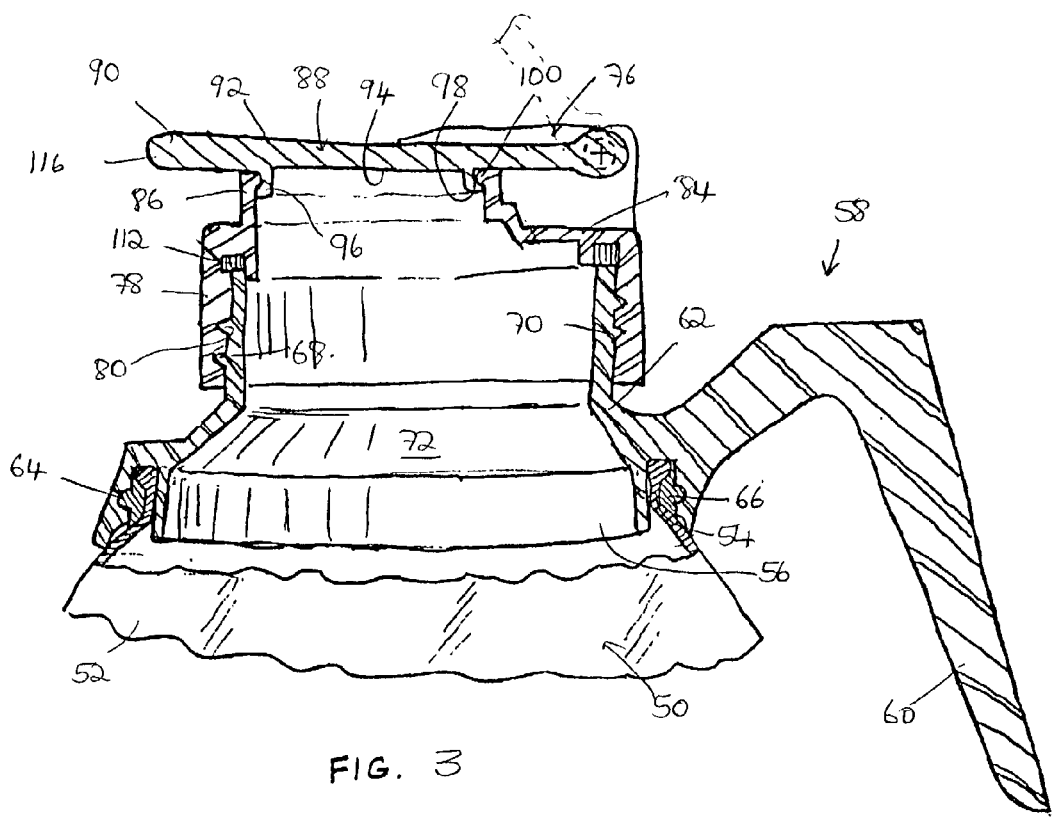
FIG. 3 is a more detailed cross-section through one preferred embodiment of the lid of the invention, when attached to a carafe.
Figure 4:
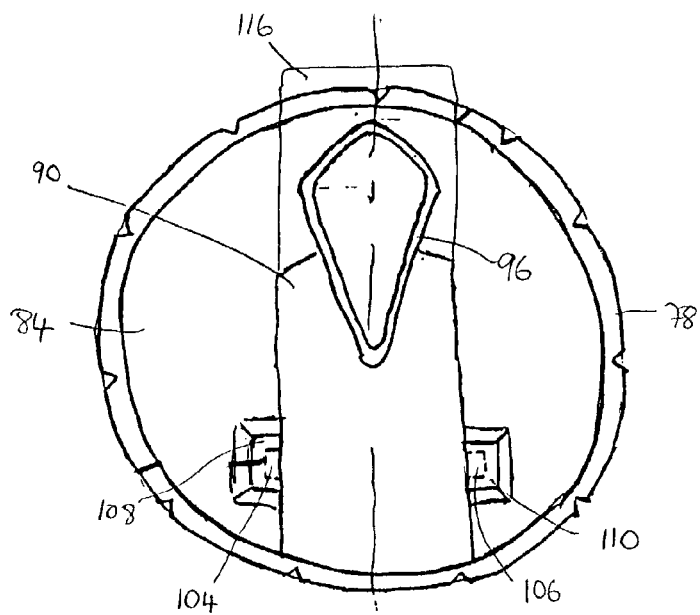
FIG. 4 is a top view of the lid shown in FIG. 3 of the drawings.
Figure 5:
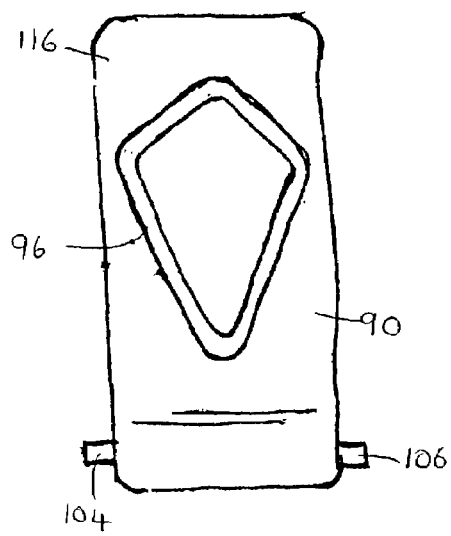
FIG. 5 is a bottom view of the stopper member of the lid shown in FIG. 4 of the drawings.
Figure 6:
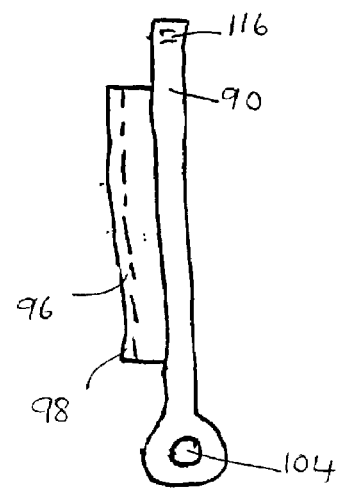
FIG. 6 is a side view of the stopper member shown in FIG. 5 of the drawings.

Reference is now made to FIGS. 3 to 6 of the drawings, which show another embodiment of the carafe and lid assembly of the invention. This view shows the carafe and lid mainly in cross-section. A carafe 50 includes a side wall 52 (of which only a part is shown in FIG. 3), the side wall 52 terminating in a rim 54, the rim 54 defining an open space 56. A handle 58 is affixed to the rim 54, the handle 58 essentially comprising the holder portion 60 and a circumferential portion 62. The circumferential portion 62 includes a channel 64 in which the rim 54 is received, and a seal 66 is also formed in the channel 64 so that the handle 58 is attached to the rim 54 in an airtight and watertight fashion.

The circumferential portion 62 further comprises a circular wall 68, having an external thread 70. The circumferential portion 62 defines a passage 72 by means of which coffee, or other hot beverage, may be introduced into, or poured from, the carafe 50.

A lid assembly 76 is attached to a circular wall 68 of the handle 58. The lid assembly 76 comprises a connecting wall 78, having an internal thread 80, the internal thread 80 of the connecting wall 78 being releasably attachable to the external thread 70 of the circular wall 68. The lid assembly 76 further comprises a top wall 84, forming a spout 86.

A stopper 88 is connected generally to the top wall 84 of the lid assembly 76. The stopper 88 is movable between a first closed position as shown in FIG. 3 of the drawings, and an open position, shown in phantom lines also in FIG. 3. The stopper 88 comprises a plate 90 having an upper surface 92 and a lower surface 94. On the lower surface 94, there is formed a downwardly depending rim 96, which is of substantially the same shape and dimension as the spout 86, and a flange 98 on the rim 96 engages a flange 100 on the spout 86 to form a tight seal between the plate 90 and the spout 86, to sealingly close off the spout 86 thereby preventing any flow of air and moisture therethrough.

The plate 90 has, near one end thereof, a pair of opposed pivot pins 104 and 106, which are received within pivot channels 108 and 110 respectively. The connection of the plate 90 to the top wall 84 is such that the plate 90 can rotate or pivot about the pivot pins 104 and 106, enabling the plate 90 to move between the closed and open positions.

It will be noted that a seal 112 is provided on the top of the circular wall 68 to enhance the seal between the handle 58 and the lid assembly 76.

In operation, the plate 90 is rotated about pivot pins 104 and 106 so as to provide an open spout 86 through which coffee can be introduced to the carafe 50 during the brewing process. Once brewing is complete and all the coffee is in the carafe 50, the plate 90 is rotated and snapped shut into the closed position, as shown in FIG. 3, with the flanges 98 and 100 engaging each other to provide a solid connection, which will resist being forced open due to internal vapor pressures which may form within the carafe 50 when the coffee is heated. When it is desired to pour coffee from the carafe, the plate 90 is simply forced open, preferably by the user engaging the tab portion 116 of the plate 90, and rotating it about pivot pins 104 and 106 to open the spout 86. Coffee is poured, as desired, and the plate 90 is then snapped shut again to preserve the coffee flavor and aroma, as described.

Figure 7:
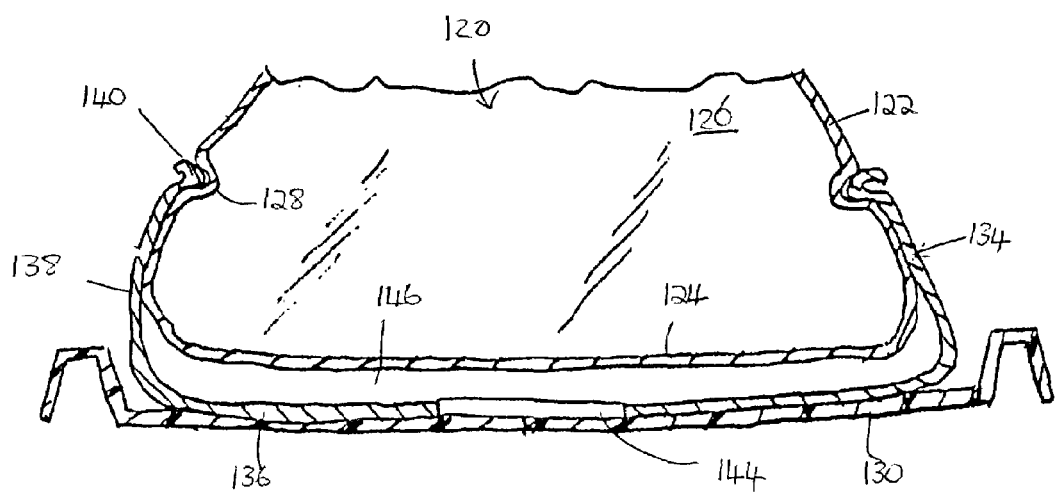
FIG. 7 is a cross-section through one preferred embodiment of a carafe and heat modulating means in accordance with a further aspect of the invention.

Reference is now made to FIG. 7 of the drawings which shows a heat attenuator or modulating device which would typically be located for use on a coffee maker or hot plate. In FIG. 7, a carafe 120 is shown having side walls 122 and a base 124, both defining a chamber 126 in which brewed coffee is stored. In the embodiment shown in FIG. 7, a peripheral indent or recess 128 is formed within the side wall 122 near the base 124 of the carafe 120.

In normal usage, the carafe 120 would be placed on a hot plate 130, the hot plate 130 being attached or forming part of a coffee maker structure as is conventionally known. On the other hand, the hot plate 130 may be a discrete and separate component which has nothing to do with a coffee maker, but is merely provided as a surface to keep coffee hot.

A heat modulator 134 is provided, and is located between the hot plate 130 and the base 124 of the carafe. The heat modulator 134 comprises a base portion 136, and side portions 138. At the terminal end of each side portion 136, there is formed an inwardly directed projection 140 which is configured so as to be received within the recess 128. At approximately the mid-point of the base portion 136, there is formed an aperture 144.

In use, the heat modulator 134 is located on the hot plate 130. When the carafe 120 has been filled with coffee and is ready to be heated in the "keep warm mode", the base 124 of the carafe is pushed past the side portions 138, which are resilient and can extend outwardly to accommodate the passage of the carafe 120 therethrough. The carafe 120 is inserted to the point where the recess 128 meets the projection 140. At this point, the projection 140 snaps into the recess 128, and holds the carafe within the heat modulator 134.

In one embodiment, the heat attenuator or modulator is permanently assembled to the carafe. In such an embodiment, the snap on grooves described above may be used to eliminate the problems associated with gluing or other attachment mechnisms.

It will be noted that the base 124 of the carafe 120 is spaced from the base portion 136. The space 146 contains air, which is heated by conduction and/or convention of heat through the base portion 136, and direct heating of the air in the space 146 by the hot plate 130 at that location immediately below the aperture 144.

As a general rule, all or nearly all of the institutional restaurant and/or office-type coffee makers provide hot plates which tend to heat coffee in conventional carafes to very high serving temperatures, often usually around 180-185° F. The sealed carafe and lid assembly of the invention has the effect of elevating the coffee temperature by approximately 15-20° F. when it is heated on these hot plates. At elevations of over 5,000 feet above sea level, the carafe of the invention may therefore cause the coffee to boil. In order to ensure that the coffee will not reach boiling temperature, especially at high elevations, the hot plate heat must be attenuated or modulated downwardly to a safe temperature. This is ideally accomplished by adjusting the heat which the hot plate puts out or emits, but for many reasons, this may not be practical or possible to the average user. The heat modulator 134, as described with respect to FIG. 7 of the drawings, helps to assure that the additional heat that a carafe of the invention attains, due to the sealed nature of the lid, is safely compensated. The heat modulator 134 snaps together to connect with the carafe as described with respect to the recesses 128 and projections 140. The recesses 128 are molded during the manufacturing process into the glass, typically borosilicate glass, of the carafe, and this keeps it in the desired place. The limited contact between the heat modulator 134 and the carafe 120, as well as the resilience of the heat modulator, addresses concerns which may be caused by virtue of the difference in thermal expansion characteristics between the two materials. Any suitable connection between heat modulator and carafe may, however, be used. Although glass is described above as the material of which the carafe is constructed, any suitable material may be used, including appropriate plastics.

Figure 8:
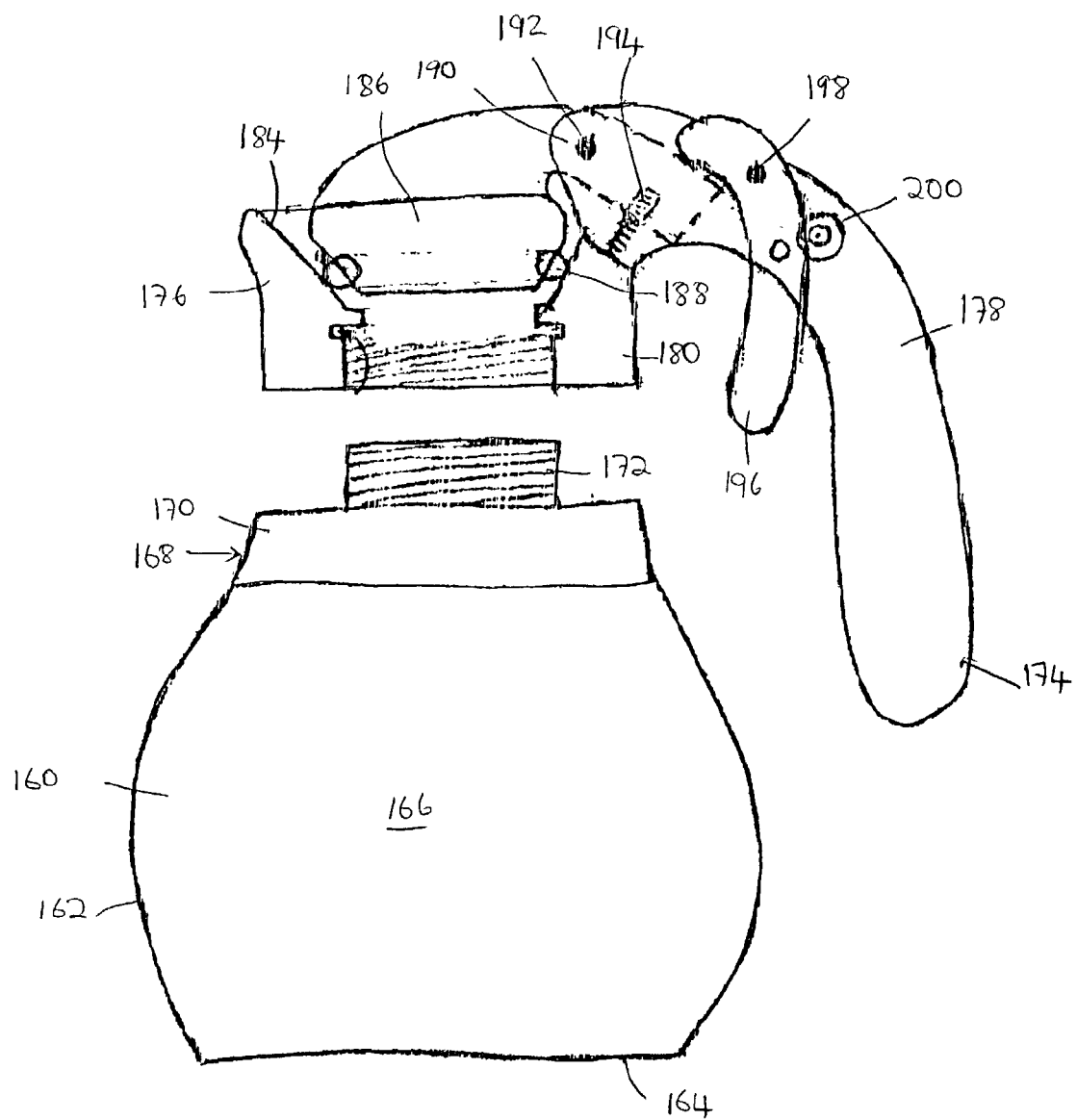
FIG. 8 is a side view, partially in section, of a carafe and lid according to a further embodiment of the invention.

Reference is now made to FIG. 8 of the drawings, which shows yet another embodiment of the carafe and lid assembly of the invention. FIG. 8 shows a carafe 160 having side walls 162 and a base 164 which define a chamber 166. The side walls 162 have an upper edge 168, upon which a rim piece 170 is connected. The rim piece 170 includes a centrally located, externally threaded cylindrical wall 172, which receives the handle/lid assembly 174.

The handle/lid assembly 174 comprises a lid portion 176 and a handle portion 178. The lid portion 176 has cylindrical side walls 180 having an internal thread designed to engage the external threads of the cylindrical wall 172. The side walls 180 taper to form a frusto-conical space 184, in which is received a stopper 186. The stopper 186 has a peripheral seal 188, so that when the stopper 186 is forced down on the tapering portion 184, an airtight seal will be formed.

A mechanism for opening and closing the stopper 186 is provided. A stopper opener 190 is connected by a pivot 192 to the handle/lid assembly. A spring 194 tends to urge the stopper opener 190 upward, as shown in FIG. 8 of the drawings, to cause the stopper 186 to move to the open position. A cam lever 196, connected by pivot 198 to the handle/lid assembly 174 is capable of rotating about pivot 198 selectively, so as to act upon the stopper opener 190, to thereby open or close the stopper 186, as desired. When the cam lever 196 is moved in an clockwise direction, it bears down on the stopper 186, to move it into the closed, sealed position. However, when the can lever 196 is rotated anticlockwise, it relieves pressure on the stopper opener 190, enabling the spring 194 to move the stopper opener 190 in such a way as to open the stopper 186. A spring-loaded locking pin 200 is provided to lock the mechanism so that the stopper 186 is in the open position during brewing and pouring of the coffee. In other situations, the stopper 186 will be locked into the closed position, to seal the carafe and thereby preserve the volume and flavor of the coffee therein.

The lid may also include various forms of pressure valves which yield to a predetermined pressure level to prevent compromise of the lid when used on a carafe. Such valves may include check valves or relief valves.

Several embodiments of the invention have been described above, but the invention is not limited to these particulars. In essence, it should be understood that the invention relates to a method of sealing an open carafe with an appropriately configured lid so as to prevent escape of air thereof/therefrom, as well as the loss of water and flavor particles due to evaporation. The invention also comprises the use, in certain circumstances, of a heat modulator so that the temperature within a carafe can be controlled when a hot plate giving off sufficient heat to cause undesirably high pressures within the carafe are only available.

The invention claimed is:

1. A lid for a hot beverage container having a base, side walls and an upper rim, the lid comprising:
   a body member having an upper surface, a lower surface and an end wall;
   means associated with the end wall for sealingly connecting the wall of the lid to the upper rim of the beverage container to provide and airtight seal therebetween;
   an aperture extending through the body member from the upper surface to the lower surface thereof and through which liquid in the beverage container can be poured from the beverage container to the exterior thereof; and
   a stopper member movable between a first closed position and a second open position for selectively closing off and opening the aperture in the body member, the stopper member when in the first closed position defining an airtight seal with the aperture which is capable of withstanding pressure from the inside of the beverage container produced by heated liquid in the beverage container to substantially prevent discharge of contents in the container when heated.

2. A lid as claimed in claim 1 wherein the body member comprises a substantially flat disc-shaped member.

3. A lid as claimed in claim 1 wherein the body member comprises a substantially horizontal surface and peripheral depending side wall extending therefrom, the depending side walls sealingly connected to the upper rim of the carafe.

4. A lid as claimed in claim 1 wherein the body member comprises a substantially circular member having depth, the aperture being formed through the depth of the circular member, a portion of which sealingly engages with an upper rim of the carafe.

5. A lid as claimed in claim 1 further comprising a small orifice formed within the lid to provide limited communication between the carafe and ambient space.

6. A lid as claimed in claim 5 wherein the orifice is formed in the stopper member.

7. A lid as claimed in claim 1 wherein the stopper member moves between the first and second position by sliding on or in tracks formed on the upper surface of the body member.

8. A lid as claimed in claim 1, wherein the stopper member comprises pivot members connected to the body member, the stopper member being pivotable between the first and second position.

9. A lid as claimed in claim 1 wherein the stopper member has a flange whose shape and dimensions correspond substantially with that of the aperture, the flange being received within the aperture to provide a tight seal.

10. A lid as claimed in claim 1 further comprising a lever arm for effecting movement of the stopper member between the first and second position.

11. A lid as claimed in claim 1 further comprising a pressure valve selected to yield to a predetermined pressure level to prevent compromise of the lid when used on a carafe.

12. A lid as claimed in claim 1 wherein the aperture comprises a passage in the body member.

13. A carafe and lid assembly comprising:
   a carafe having a base wall and an upwardly extending sidewall terminating in an upper rim, the carafe having a chamber for containing a hot beverage;
   a lid sealingly received within the upper rim of the carafe to form an airtight seal therewith, the lid comprising:
   a body member having an upper surface, a lower surface and an end wall which abuts and seals with the upper rim of the carafe,
   an aperture formed in the body member and extending from the upper surface to the lower surface thereof to provide a passage between the chamber of the carafe and the ambient space outside the carafe,
   a stopper member formed about the aperture, the stopper member being movable between a first closed position and second open position for selectively closing off and opening the aperture in the body member, the stopper member when in the first closed position defining an airtight seal with the aperture which is capable of withstanding pressure from the inside of the beverage container produced by heated liquid in the beverage container to substantially prevent discharge of contents in the container when heated.

14. A carafe and lid assembly as claimed in claim 13, further comprising a handle between the carafe and the lid, the handle comprising a circular rim permanently sealed to the upper rim of the carafe, and a holding means attached thereto.

15. A carafe and lid assembly as claimed in claim 14 wherein the handle assembly comprises an upwardly extending wall having an external thread, and the body member of the lid comprises a downwardly depending wall with an internal thread for fastening to the external thread of the handle.

16. A carafe and lid assembly as claimed in claim 13, further comprising a small orifice formed within the lid to permit very slow discharge of water and other particles from the chamber.

17. A carafe and lid assembly as claimed in claim 13, further comprising a pressure valve configured so as to yield to pressure within the chamber to avoid compromise of the carafe and lid assembly.

18. A carafe and lid assembly as claimed in claim 13, further comprising a heat modulator, the heat modulator being configured so as to rest on a hot plate, and having means for receiving the carafe so that the base wall thereof will not be in direct contact with the hot plate.

19. A carafe and lid assembly as claimed in claim 18 wherein the heat modulator comprises a base, an upwardly extending side wall, and the means for engaging the carafe comprises a groove-and- projection configuration constructed into the heat modulator and carafe.

20. A carafe and lid assembly as claimed in claim 19 wherein the base of the heat modulator includes an aperture therein.

21. A lid for a hot beverage container having a base, side walls and an upper rim, the lid comprising:
   a body member having an upper surface, a lower surface and an end wall;
   an aperture extending through the body member from the upper surface to the lower surface thereof and through which liquid in the beverage container can be poured from the beverage container to the exterior thereof; and
   a stopper member movable between a first closed position and a second open position for selectively closing off and opening the aperture in the body member, the stopper member when in the first closed position defining an airtight seal with the aperture which is capable of withstanding pressure from the inside of the beverage container produced by heated liquid in the beverage container to substantially prevent discharge of contents in the container when heated.

22. A method for prolonging the volume content and aroma of a hot brewed beverage in a carafe having a lid, the method comprising:
   attaching the lid to the carafe so as to provide an airtight sealed space defined by the carafe and lid;
   forming an aperture in the lid so that the space in the carafe can communicate with the exterior thereof;
   selectively opening and closing the aperture in the lid by means of a movable stopper member, the aperture being open when beverage is being introduced to the space and poured therefrom, and closed when the beverage remains unused in the space, the stopper member when closing the aperture creating an airtight seal of the aperture which is capable of withstanding pressure from the inside of the beverage container produced by heated liquid in the beverage container to substantially prevent discharge of contents in the container when heated.

* * * * *